United States Patent Office 2,933,521
Patented Apr. 19, 1960

2,933,521
ESTERS OF 4,4-BIS(HYDROXYPHENYL)-
PENTANOIC ACID

Sylvan Owen Greenlee, Racine, Wis., assignor to S. C. Johnson & Son, Inc., Racine, Wis.

No Drawing. Continuation of application Serial No. 500,695, April 11, 1955. This application July 17, 1957, Serial No. 672,356

6 Claims. (Cl. 260—473)

This invention relates to new chemical compounds derived from an alcohol and a novel organic acid. More particularly, this invention relates to new esters prepared from a long-chain unsaturated alcohol and an acid which is substituted with polymerizable groups. This is a continuation of my earlier co-pending application S.N. 500,-695, filed April 11, 1955 now abandoned.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Important resin plasticizers are the drying oils, which contain the glycerides of unsaturated acids of 18 to 22 carbon atoms, and the reduction products of such oils. These oils are highly desirable not only for plasticizing, but also for the conversion characteristics which they impart due to their unsaturation. The present compositions provide a means of chemically uniting in each molecule one or more plasticizing or converting groups which may be derived from such drying oils together with a residue capable of being treated to form valuable insoluble, infusible compositions.

Compounds capable of accomplishing the above ends are the esters of long-chain unsaturated alcohols and an aryl-substituted pentanoic acid. Such compositions may be prepared, for example, by reacting 1 mol of a Diphenolic Acid, such as 4,4-bis(hydroxyphenyl)-pentanoic acid, with 1 mol of 9,10-octadecenol, also known as oleyl alcohol, a reduction product of oleic acid.

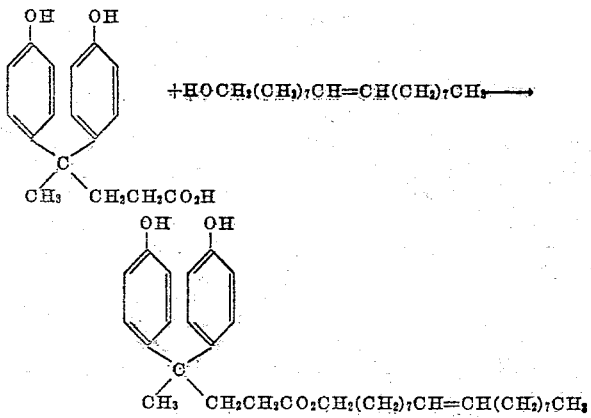

In prior applications, Serial Nos. 464,607 and 489,300 filed October 25, 1954 and February 18, 1955 now abandoned, respectively, there are disclosed a number of compounds which are suitable for use as the aryl-substituted pentanoic acid herein contemplated. These materials, which are referred to for convenience as Diphenolic Acids, consist of the condensation products of levulinic acid and phenol or substituted phenols or mixtures thereof. It is to be understood that the phenolic nuclei of the Diphenolic Acids may be substituted with any groups which will not interfere with the esterification reactions. For example, the nuclei may be alkylated as disclosed in Serial No. 489,300 or they may be halogenated.

The long-chain unsaturated alcohols suitable for use in preparing the esters of this invention include those containing at least about 10 carbon atoms. Illustrative of such alcohols are the reduction products of natural-occurring unsaturated oils, such as China-wood oil, dehydrated castor oil, linseed oil, soya bean oil, corn oil, and cottonseed oil. The fish oils constitute an additional important source of operable unsaturated alcohols. They contain the glycerides of highly unsaturated acids and have an iodine value ranging from about 130 to 190. These alcohols are usually prepared by selective reduction of the corresponding oils or the simpler esters of the oil acids. A typical method is the sodium reduction, whereby the ester group is reduced to a hydroxyl group without saturating the olefin group. Alcohols having a lower molecular weight may also be used, but those containing less than about 10 carbon atoms contribute little plasticization. The upper limit on the chain length of operable alcohols is determined only by their availability since any high molecular weight alcohol will impart plasticizing. If air-drying characteristics are considered paramount, it would be better to choose a lower molecular weight material. Undecenol is an example of one of the lower unsaturated alcohols contemplated herein. It may be obtained by reducing undecenoic acid, the decomposition product of castor oil acids. Similar alcohols may, in some cases, be made by modification of the naturally-occurring oil products. For example, methyl oleate might be oxidized to dihydroxymethyl stearate, a material which on dehydration yields the corresponding methyl octadecadienoate. The latter product is capable of reduction to the corresponding octadecadienol.

The synthetic esters as herein disclosed are conveniently prepared by direct heating at temperatures of from 190-275° C. under conditions where the water produced during condensation is continuously removed as it is formed. Since the Diphenolic Acid compounds are prepared from the long-chain unsaturated alcohols having boiling points which are in excess of 190° C., the water may be removed by permitting it to volatilize during esterification. Removal of the water may also be facilitated by continuously bubbling through the reaction mixture during esterification a stream of inert gas such as carbon dioxide or nitrogen. It is also sometimes convenient to facilitate the water removal by carrying out the reaction in a vessel provided with a condenser attached thereto through a water trap, adding a sufficient amount of a volatile water-insoluble solvent to give reflux at the esterification temperature, and continually removing the water by azeotropic distillation permitting the solvent to return to the reaction mixture after having dropped the water in the water trap.

The new esters of the instant invention each contain within the same molecule an unsaturated residue of the plasticizing type, together with a group which is very reactive with certain materials to form compositions highly sensitive to polymerization to infusible, insoluble coating or molding products. Bis(4-hydroxyphenyl) isopropylidene, also known as bisphenol, is very similar to the dihydric phenol structure found in the subject mixed esters. When reacted with either aldehydes or epoxides, this material yields compositions which are almost quantitatively insoluble in drying oils and the simpler esters of unsaturated acids of 18 to 22 carbon atoms. The present compositions, containing the bisphenol type structure chemically bound as an integral part of a molecule which also contains a plasticizer, may be reacted with such reagents as aldehydes and epoxides to form compositions which may be polymerized to form valuable insoluble, infusible compositions. However, in the latter products, the resinous and plasticizing materials are chemically united so that there can be no physical separation thereof during or after processing, and the characteristics contributed by each will be found undiminished in the end product.

Having thus described the invention, a series of illustrative examples are presented below. These embodiments are not intended to limit the invention and should not be so construed. Quantities of materials expressed are parts by weight unless otherwise indicated.

Example I

A mixture of 286 parts of a Diphenolic Acid, prepared from phenol and levulinic acid, and 268 parts of Makanol 8 (an alcohol prepared by reduction of soyabean oil and having a specified iodine value range of 138–154, produced by Stepan Chemical Company) in a 3-neck flask provided with a thermometer, a mechanical agitator, and reflux condenser attached through a water trap was gradually heated to 205° C. A sufficient amount of xylene was added to give refluxing at the esterification temperature. The continuously agitated mixture was heated at 205–240° C. for 4½ hours and held at 240° C. for an additional 30 minutes during which time a water leg vacuum of about 30 mm. pressure was applied to remove the last traces of xylene. This product had an acid value of 6.

Example II

A mixture of 286 parts of a Diphenolic Acid, prepared from phenol and levulinic acid, and 268 parts of Makanol 9 (an alcohol prepared by reduction of linseed oil and having a specified iodine value range of 193–225, produced by Stepan Chemical Company) in a 3-neck flask provided with a thermometer, a mechanical agitator, and reflux condenser attached through a water trap was gradually heated to 175° C. A sufficient amount of xylene was added to give refluxing at the esterification temperature. The continuously agitated mixture was heated at 180–220° C. for a period of 7½ hours and then taken to 240° C. for an additional 30 minutes durwhich time a water leg vacuum of about 30 mm. pressure was applied to remove the last traces of xylene. This product had an acid value of 5.

Example III

A mixture of 286 parts of Diphenolic Acid, prepared from phenol and levulinic acid, and 268 parts of oleyl alcohol in a 3-neck flask provided with a thermometer, a mechanical agitator, and reflux condenser attached through a water trap was gradually heated to 175° C. with continuous agitation. To the molten mixture was added sufficient xylene to give reflux at the esterification temperature. The continuously agitated mixture was heated at 175–190° C. for 10 hours and then taken to 200° C. for about 1 hour during which time a water leg vacuum of about 30 mm. pressure was applied to remove the last traces of xylene. This product had an acid value of 15.

Example IV

A mixture of 286 parts of Diphenolic Acid, prepared from phenol and levulinic acid, and 268 parts of Adol 33 (8% $C_{16}$ alcohols, 84.5% $C_{18}$ alcohols, and 7.5% $C_{20}$ alcohols, having an iodine value of 71, produced by Archer-Daniels-Midland Company) in a 3-neck flask provided with a thermometer, a mechanical agitator, and reflux condenser attached through a water trap was gradually heated to 175° C. with continuous agitation. To the molten mixture was added sufficient xylene to give reflux at the esterification temperature. The continuously agitated mixture was heated at 175–195° C. for a period of 13 hours and held at 195° C. for an additional hour during which time a water leg vacuum of about 30 mm. pressure was applied to remove the last traces of xylene. This product had an acid value of 10.

Example V

A mixture of 286 parts of Diphenolic Acid, prepared from phenol and levulinic acid, and 268 parts of Adol 37 (2.8% $C_{14}$ alcohols, 32.6% $C_{16}$ alcohols, 60.7% $C_{18}$ alcohols, and 3.9% $C_{28}$ alcohols, having an iodine value of 50, produced by Archer-Daniels-Midland Company) in a 3-neck flask provided with a thermometer, a mechanical agitator, and reflux condenser attached through a water trap was gradually heated to 165° C. with continuous agitation. To the molten mixture was added sufficient xylene to give reflux at the esterification temperature. The continuously agitated mixture was heated at 165–190° C. for 13 hours and held at 195° C. for an additional 30 minutes during which time a water leg vacuum of about 30 mm. pressure was applied to remove the last traces of xylene. This product had an acid value of 7.

Example VI

Illustrating how these products may be used in the preparation of protective coating materials, the product of Example I was treated with 3 mols of 37% aqueous formaldehyde using a trace of HCl as catalyst and heating the mixture for a period of 1 hour and 15 minutes at 95° C. with continuous agitation. The water was removed by finally heating the product in an open container to a temperature of 110° C. The resulting product was dissolved in a solvent consisting of equal parts of butyl acetate, butanol, and methyl isobutyl ketone. Thin films of this product flowed on steel panels and baked for 15 minutes at 200° C. gave flexible, tack-free surfaces.

While there are above disclosed but a limited number of embodiments of the product of the invention herein presented, it is possible to produce still other embodiments without departing from the inventive concept herein disclosed, and it is desired, therefore, that only such limitations be imposed on the appended claims as are stated therein, or required by the prior art.

What is claimed is:

1. As a new composition of matter an ester of an unsaturated aliphatic alcohol having at least 10 carbon atoms and containing only the elements carbon, hydrogen and oxygen and a pentanoic acid having the formula:

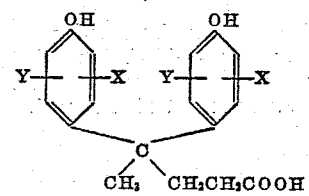

wherein X and Y are members of the group consisting of hydrogen and lower alkyl.

2. As a composition of matter the ester of 4,4-bis (4-hydroxyphenyl) pentanoic acid and an unsaturated vegetable oil fatty alcohol.

3. As a composition of matter an ester of 4,4-bis (4-hydrophenyl) pentanoic acid and an unsaturated fish oil fatty alcohol.

4. As a composition of matter the ester of 4,4-bis (4-hydroxyphenyl) pentanoic acid and oleyl alcohol.

5. As a composition of matter the ester of 4,4-bis (4-hydroxyphenyl) pentanoic acid and linseed oil fatty alcohol.

6. As a composition of matter the ester of 4,4-bis (4-hydroxyphenyl) pentanoic acid and soya bean oil fatty alcohol.

References Cited in the file of this patent

Bader: J. Am. Chem. Soc., vol. 76, pp. 4465–6 (1954).
Bader: J. Am. Chem. Soc., vol. 75, pp. 5416–17 (1953).

UNITED STATES PATENT OFFICE
CERTIFICATE OF CORRECTION

Patent No. 2,933,521            April 19, 1960

Sylvan Owen Greenlee

It is hereby certified that error appears in the printed specification of the above numbered patent requiring correction and that the said Letters Patent should read as corrected below.

Column 4, line 8, for "3.9% $C_{28}$" read -- 3.9% $C_{20}$ --.

Signed and sealed this 18th day of October 1960.

(SEAL)
Attest:
KARL H. AXLINE
Attesting Officer

ROBERT C. WATSON
Commissioner of Patents